United States Patent Office 3,674,440
Patented July 4, 1972

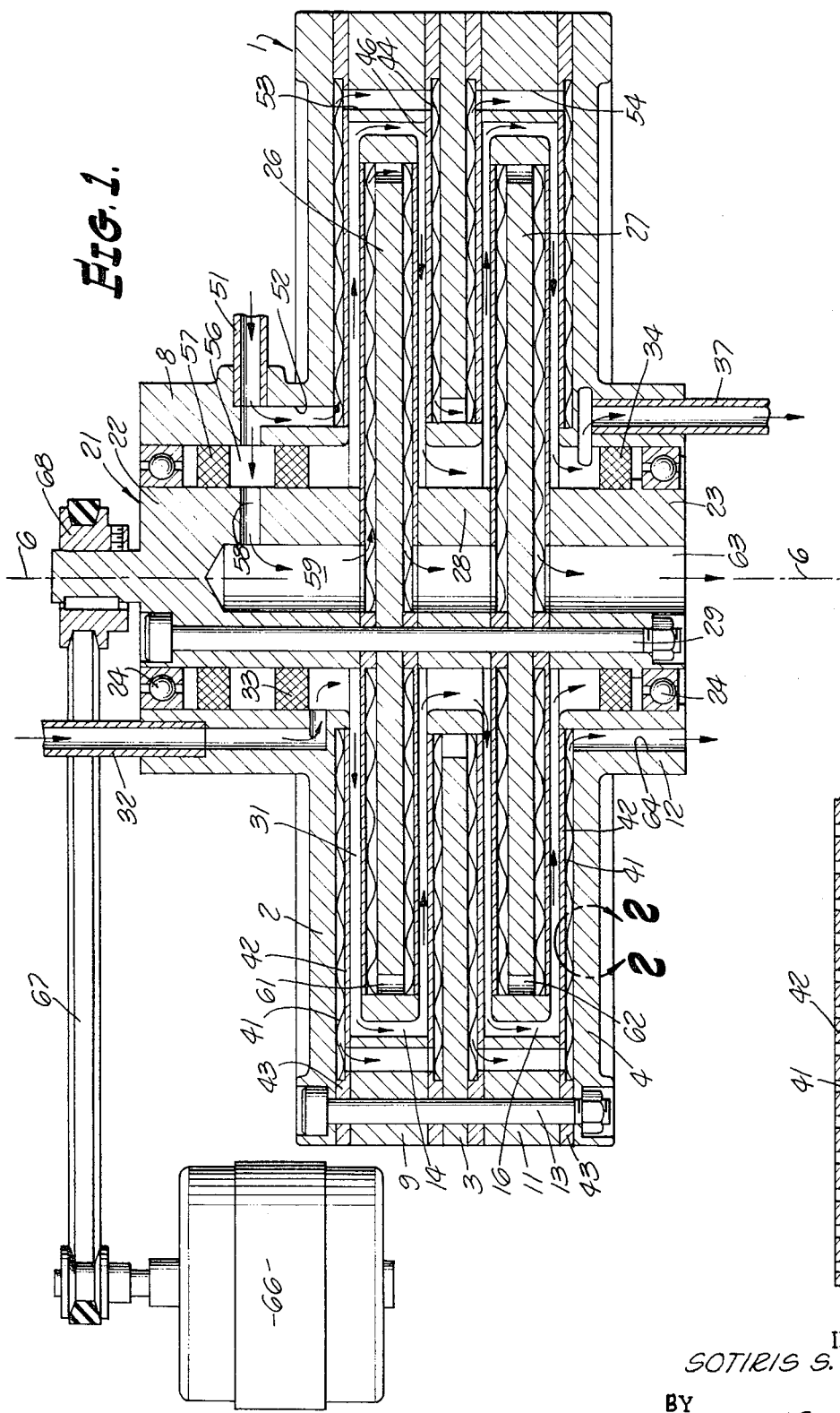

3,674,440
OXYGENATOR
Sotiris S. Kitrilakis, Newton, Mass., assignor to
Tecna Corporation
Filed May 7, 1970, Ser. No. 35,401
Int. Cl. A61m 1/03
U.S. Cl. 23—258.5     8 Claims

ABSTRACT OF THE DISCLOSURE

An oxygenator primarily for human blood has a first stationary unit with a first substantially flat wall and a second movable unit with a second substantially flat wall facing the first wall. On their facing sides both walls have supports highly permeable to gas. The supports are covered by gas permeable, hydrophobic membranes between them defining a passage for liquid. Several of the first units and second units are sandwiched to make the passage long and tortuous or sinuous. Blood flowing through the passage is perfused by oxygen flowing in through the permeable supports and the membranes and gives up carbon dioxide flowing out through the membranes and supports. The gas transport into and out of the blood is enhanced by rotating the units relative to each other. This produces fairly regular vortical motion of the blood and reduces the thickness of the boundary layer of the blood.

---

In recent years there has been a great development in artificial organs and particularly in devices for extra-corporeal circulation of the blood to relieve it of carbon dioxide and to increase its oxygen content. These devices have taken various forms. The requirements are not to injure or traumatize the blood, to afford adequate blood flow rates with small internal or priming blood volume, to have a compact mechanism so that it can be readily utilized in the usual operating theaters or intensive care facilities and to afford supervision and operation by those of only moderate mechanical skill and training. In addition, the requirements include reliable sterilization and preferably relatively economical construction and maintenance. The devices actually in use and reflected in the literature have some or many of the required advantages. Yet there is still a field for an improved oxygenator. Also, while prime interest is in connection with the treatment of human blood, there is a parallel field for the oxygenation of blood of other animals and there is interest in other processes in which a gas exchange in liquid is contemplated.

It is therefore an object of the invention to provide an oxygenator more fully meeting the various standard requirements noted.

A further object of the invention is to provide an oxygenator which is mechanically quite simple and economical, can readily be operated by relatively unskilled persons, and can easily be sterilized with certain portions economically renewable for repeated use.

A further object of the invention is to treat the flowing blood favorably during the gas exchange so that it is not traumatized by mechanical, hydrodynamic or surface damage in the oxygenator.

A further object of the invention is to provide an oxygenator in which the exchange of gas in the blood is greatly facilitated so that the size and bulk of the apparatus are not objectionable and surface area is very small.

A further object of the invention is to provide an oxygenator making use of various materials having favorable characteristics so far as oxygenation is concerned and to use them so that their mechanical life is protracted.

Other objects together with the foregoing are attained in the embodiment of the invention described in the accompanying description and illustrated in the accompanying drawings, in which:

FIG. 1 is a cross section on an axial plane through one form of oxygenator constructed in accordance with the invention, certain portions being shown diagrammatically and various standard peripheral structures being omitted; and FIG. 2 is a cross section to a greatly enlarged scale, the cross section being of a portion of the structure included with the lines 2—2 of FIG. 1.

As adapted for use in oxygenating human blood, the oxygenator of the invention has been incorporated with practical success in the form shown in the drawings. This includes a relatively stationary first unit 1. Included in the first unit are several walls 2, 3 and 4, for example, referred to as primary walls, all of which are conveniently flat or substantially planar or disc-like. They are preferably circular and are normal to a central axis 6. Adjacent the first primary wall 2 is a hub 8. The first primary wall 2 is situated a predetermined axial distance from the second primary wall 3 by an intervening spacer 9 and other elements. Similarly the third primary wall 4 is separated from the second primary wall 3 by a similar intervening spacer 11 and other elements. The primary wall 4 is adjacent a hub 12 symmetrical about the axis 6. The first unit 1 is provided with an appropriate support, not shown, but arranged so that the first unit is held in a stationary location and so can be considered as a stator, preferably with its axis 6 vertical.

The first unit 1 is constructed so that it can readily be assembled and disassembled. For example, the primary walls 2, 3 and 4 and the spacers 9 and 11 are arranged in what is termed a sandwich array since one is stacked upon the other. An odd number of fasteners 13 removably hold the first unit parts in assembled condition—in effect clamping the various portions tightly together in an axially compact bundle. This arrangement provides an annular chamber 14 between the primary walls 2 and 3 and similarly provides an annular chamber 16 between the primary walls 3 and 4.

Arranged within the first unit 1 or stator is a second unit 21 or rotor, likewise symmetrical about the axis 6. Hubs 22 and 23 are arranged at opposite ends of the rotor and are supported in anti-friction bearings 24, located within the hubs 8 and 12. The hubs 22 and 23 are in a sandwich array with a secondary wall 26 extending radially into the chamber 14 and with another secondary wall 27 extending radially into the chamber 16. A spacer 28 and other elements are interposed between the secondary walls 26 and 27 and other elements are disposed between the secondary walls and the hubs 22 and 23. The sandwich array of the rotor 21 is releasably maintained by an odd number of through fasteners 29. Since the secondary walls 26 and 27 extend into the chambers 14 and 16 the resulting intervening passage 31 is sinuous or undulatory in character and affords a relatively great length and large surface area with small volume for the size of the device.

Extending through the hub 8 into the entrance of the passage 31 is a blood inlet conduit 32 which is connected to any suitable source of liquid under sufficient pressure to overcome even the relatively low resistance to flow of the liquid through the device. A seal 33 precludes leakage between the rotor and stator. The blood flows from the conduit 32 into the passage 31 thence in a sinuous pattern to a point adjacent a seal 34 at which there is a blood outlet conduit 37 extending, usually, either to other apparatus or for recirculation.

Pursuant to the invention the various walls of the first unit and of the second unit are treated similarly in order to afford appropriate interchange of gases with the circulating liquid. As an example, the primary wall 2 on its inner face is provided with a support wafer 41. This is preferably an annular, sheet-like member extending to substantially the outer diameter of the wall but stopping somewhat short of the axis 6. The wafer is constituted so as to permit gas flow in any direction in the space partially occupied by the wafer. To this end the wafer can be constructed in a number of different ways. For example, the wafer can be a porous ceramic-like material or can be a corrugated or expanded plastic screen or the like. The prime requirement is that gas can enter and leave the wafer at any point and can travel in substantially any direction and can be uniformly distributed. The wafer 41 also has the attribute of acting as a physical positioner and support. A membrane 42 is superposed thereon on the side of the wafer opposite the primary wall 2. The membrane 42 is highly important in the mechanism. Preferably it is made of one of the presently available hydrophobic materials; that is, a material not readily wet by nor readily pervious to a liquid such as blood. The membrane is conveniently of a silicone polymer about 0.005 inch thick and has a number of very small passages therethrough. The passages or pores are of the order of 2–100 microns in approximate diameter. The membrane especially in a generally axial direction is pervious to the various gases to be conducted, such as oxygen and carbon dioxide. The openings or interstices in the hydrophobic membrane 42 are preferably small enough so that the head of the blood supported thereon is sustained without leaking through.

It is desired that certain areas of the membrane, particularly the periphery thereof and other local areas around fasteners, be impervious. The structure of the membrane is varied near the periphery and in these areas to provide a rim 43 or zone of relatively solid, sometimes thicker, material. The solid areas are hydrophobic and are impervious in any direction to the flow of fluids. As shown in FIG. 1, the arrangement is with the primary wall 2 covered with the pervious wafer 41 and the wafer in turn then covered with the membrane partly impervious and partly pervious. Similarly, the adjacent primary wall 3 is itself covered on the side nearest the primary wall 2 by a superposed supporting wafer 44 and is also provided with a membrane 46 just like the membrane 42 and arranged on the supporting wafer 44 in such fashion that the membranes 42 and 46 are adjacent to each other.

The dimensions of the parts are such that the membranes and 42 and 46 are spaced apart in an axial direction a predetermined distance to provide the intervening passage 31 for the flow of blood. The passage is continued as shown in the drawing from one region to the other through the device so that each of the main boundary walls is covered not only with a supporting wafer 41 but the supporting wafers themselves are covered by the indicated membranes 42. This affords a very large area for interchange of gases between the blood and the surroundings.

In order to afford an appropraite gas supply there is provided an oxygen intake 51 in the hub 8 the oxygen intake being split into two portions. One part communicates through a passage 52 with the uppermost wafer 41 and travels from such wafer to the other wafers in the stator which are interconnected by passages 53 and 54. The other oxygen intake branch extends through a passageway 56, protected by seals 33 and 57, into an opening 58 in the hub 22 leading to an interior chamber 59 from which flow proceeds into the adjacent wafers 41 connected by holes 61 and 62 and finally is out through an outlet opening 63 in the lower part of the central shaft.

As the oxygen travels in its divided paths it is made available on both sides of the blood passageway. The oxygen diffuses into the blood through the permeable support wafers 41 and through the membranes 42. The carbon dioxide from the blood travels through the membranes and supporting wafers into the oxygen stream. The gas discharged through a port 64 and through the outlet 63 is a mixture of unused oxygen and entrained carbon dioxide.

While the mechanism so far described is effective to interchange gases in the blood it does not have a very large gas transfer rate. To remedy this and to increase the gas transfer rate of the structure there is provided means for moving the rotor with respect to the stator preferably by rotating the rotor about the axis 6. An electric motor 66 is joined by a belt 67 to a driven pulley 68 on the hub 22 and revolves the rotor about the axis at a rate (for example, 200 to 1000 r.p.m. for a secondary wall 26 or disc diameter of 12 inches) such that the blood in flowing through the passage 31 and its sinuous extensions is made turbulent. The stirring is sufficient so that the shearing forces in the blood cause a disruption, to a large extent, of the otherwise existing boundary layer. The gas exchange is thus greatly increased. In addition, the direction of flow of the blood is alternately from near the axis to near the periphery and then reversed so that the flow velocity varies accordingly and substantially as the blood goes through the sinuous path. This itself alters the amount of stirring and the amount of shearing action, and, consequently, reduces the effect of the residual boundary layer and increases the gas transfer rate. The net result is that in practice it is found that the size of the unit and the area exposed for gas exchange can be substantially reduced over values heretofore encountered. This is also beneficial in that it reduces the trauma to the blood in that the blood is not in contact for long with the foreign materials of the structure.

It is possible, therefore, with a device of this kind to use generally inert and readily sterilizable materials and to afford a structure which can easily and quickly be assembled and disassembled. Some of the parts; for example, the membranes and the supporting wafers can be made of quite inexpensive materials and so can readily be replaced instead of being cleaned and sterilized. The compass or volume of the entire structure is greatly reduced over previous practice, trauma to the blood is greatly decreased, the interchange of gas takes place in a relatively short time and a generally improved result is afforded.

What is claimed is:

1. An oxygenator comprising a first unit including a primary wall, a first support wafer permeable to gas in substantially all directions and lying against said primary wall, a first membrane permeable to gas but not readily permeable to liquid in contact therewith and disposed against said first support wafer on the side thereof opposite said primary wall, a second unit including a secondary wall, a second support wafer permeable to gas in substantially all directions and lying against said secondary wall on the side thereof toward the primary wall, a second membrane permeable to gas but not readily permeable to liquid in contact therewith and disposed against said second support wafer on the side thereof opposite said secondary wall, means for holding said first unit and said second unit with said first membrane and said second membrane adjacent each other and spaced a predetermined distance apart when measured in a direction normal to said walls and thereby defining a passage, means for flowing gas through said wafers and said membranes, means for flowing liquid through said passage, and means for providing motion between said first unit and said second unit in an amount to produce stirring in said liquid in said passage.

2. An oxygenator as in claim 1 in which means are provided for preventing liquid flow through said support wafers adjacent the periphery thereof.

3. An oxygenator as in claim 1 in which said membranes are hydrophobic and are not readily permeable to blood.

4. An oxygenator as in claim 1 in which said first membrane and said second membrane are substantially normal to an axis and said moving means afford rotation about said axis.

5. An oxygenator as in claim 1 in which a plurality of said primary walls are combined to form a stator, and a plurality of said secondary walls are interspersed with said primary walls and combined to provide a rotor rotatable about an axis, said passage between said stator and said rotor having a sinuous contour.

6. An oxygenator as in claim 5 in which flow through said sinuous passage is alternately radially outward and radially inward relative to said axis.

7. An oxygenator as in claim 5 in which at least one pair of said primary walls has an intervening peripheral spacer to define an annular chamber and at least one of said secondary walls is disposed within said chamber.

8. An oxygenator as in claim 7 in which said plurality of primary walls in said stator and said plurality of secondary walls in said rotor are assembled in sandwich array, and means are provided for releasably holding said array in assembled condition.

References Cited

UNITED STATES PATENTS

| | | | |
|---|---|---|---|
| 2,693,802 | 11/1954 | Osborn | 23—258.5 |
| 3,026,871 | 3/1962 | Thomas | 23—258.5 |
| 3,034,505 | 5/1962 | Sobol | 23—258.5 |
| 3,060,934 | 10/1962 | Claff et al. | 23—258.5 |
| 3,183,908 | 5/1965 | Collins et al. | 23—258.5 |
| 3,332,746 | 7/1967 | Claff et al. | 23—258.5 |
| 3,352,422 | 11/1967 | Heden | 210—321 |
| 3,413,095 | 11/1968 | Bramson | 23—258.5 |
| 3,459,310 | 8/1969 | Edwards | 210—321 |
| 3,484,211 | 12/1969 | Mon et al. | 23—258.5 |
| 3,489,647 | 1/1970 | Kolobow | 23—258.5 X |

JOSEPH SCOVRONEK, Primary Examiner

B. S. RICHMAN, Assistant Examiner

128—Dig. 3; 210—321; 261—87, Dig. 28

U.S. Cl. X.R.